C. Hodgetts,
Bake Pan.

No. 87,170. Patented Feb 23, 1869.

Witnesses:
Wm A Hogan
Ph. C. Dietrich

Inventor,
C. Hodgetts
per Munn & Co
Attorney.

CHARLES HODGETTS, OF BROOKLYN, E. D., NEW YORK.

Letters Patent No. 87,170, dated February 23, 1869.

IMPROVEMENT IN SHEET-METAL PANS.

The Schedule referred to in these Letters Patent and making part of the same.

*To all whom it may concern:*

Be it known that I, CHARLES HODGETTS, of Brooklyn, E. D., in the county of Kings, and State of New York, have invented a new and improved Process of Making Sheet-Metal Pans; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
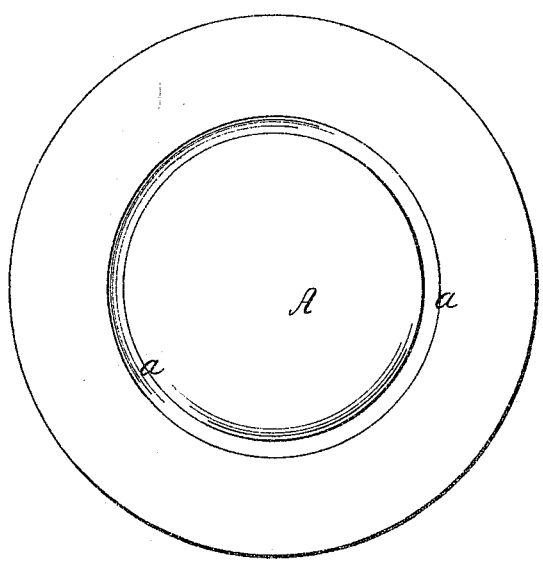
Figure 1 represents a plan view of a plate from which my pan is made.
Figure 2:
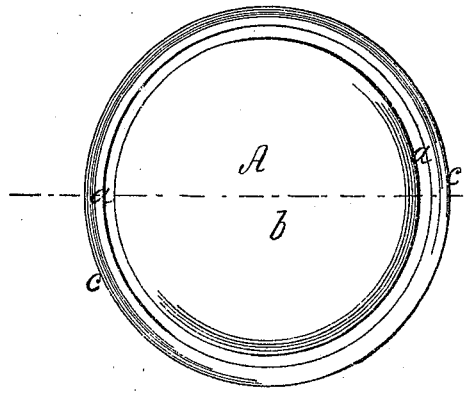
Figure 2 is a plan view of my improved pan.
Figure 3:
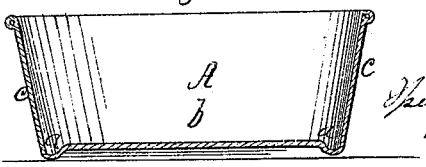
Figure 3 is a vertical section of the same.

The object of this invention is to avoid the weakening of the bottoms of sheet-metal pans; and The invention consists in forming a circular depression in the sheet-metal plate from which the pan is to be struck, and in then bending up the sides of the pan, the depression remaining in the bottom, at the junction of the same with the sides. Thereby the bottom is left undisturbed during the process of turning up the sides, and is not stretched nor strained, so that it will remain strong and durable.

A, in the drawing, represents a circular sheet-metal plate from which a pan is to be formed.

Ordinarily such plate would be formed into a pan by simply turning up the sides between a punch and die; but thereby the vessel would not only be much strained at the angle, but the bottom also would be stretched, and would thereby become porous and weak.

To avoid this, I cause, by suitable means, a circular recess or depression, *a*, to be formed on the plate.

Thereby the bottom *b*, which is within said depression, is isolated, and cannot be further stretched, when the sides *c c* are turned up by suitable means.

I am aware that sheet-metal pans have heretofore been made with an elevated bottom, but this I do not claim.

Having thus described my invention,

I claim as new, and desire to secure by Letters Patent—

The herein-described process of making sheet-metal pans from one piece of metal, by first forming a depression, *a*, in the plate from which the pan is to be made, and then turning up the sides, without stretching or straining the bottom, as herein set forth for the purpose specified.

CHAS. HODGETTS.

Witnesses:
 FRANK BLOCKLEY,
 ALEX. F. ROBERTS.